United States Patent [19]

L'Hernault et al.

[11] Patent Number: 5,532,196

[45] Date of Patent: Jul. 2, 1996

[54] INORGANIC RESINS, PROCESS FOR THEIR PREPARATION AND MATERIALS FOR HEAT PROTECTION

[75] Inventors: Claude L'Hernault, Evry; Ludovic Neel, Villequier, both of France

[73] Assignee: Societe National Des Poudres et Explosifs, Paris, France

[21] Appl. No.: 269,732

[22] Filed: Jul. 1, 1994

[30] Foreign Application Priority Data

Jul. 6, 1993 [FR] France ............................ 93 08238

[51] Int. Cl.$^6$ ............................ C04B 33/04
[52] U.S. Cl. .................. 501/128; 501/146; 501/147; 106/600; 106/602; 106/603; 428/920; 428/921
[58] Field of Search ........................... 106/600, 601, 106/602, 604, 15.05, 18.11, 18.12, 18.13, 18.14, 603; 501/146, 147, 123, 125, 128, 129, 130; 428/920, 921; 252/601

[56] References Cited

U.S. PATENT DOCUMENTS

| | | | |
|---|---|---|---|
| 3,250,725 | 5/1966 | Vescovi | 501/147 |
| 3,827,869 | 8/1974 | von Bonin | 524/5 |
| 4,224,169 | 9/1980 | Retana | 106/18.13 |
| 4,438,028 | 3/1984 | Schmittmann et al. | 106/18.13 |
| 4,521,333 | 6/1985 | Graham et al. | 106/18.13 |
| 4,533,393 | 8/1985 | Neuschaeffer et al. | 106/18.12 |
| 4,801,404 | 1/1989 | Dietrich et al. | 106/18.13 |
| 5,036,030 | 7/1991 | Taga et al. | 501/125 |
| 5,156,775 | 10/1992 | Blount | 106/18.13 |

FOREIGN PATENT DOCUMENTS

| | | |
|---|---|---|
| 0550332 | 7/1993 | European Pat. Off. . |
| 2489291 | 5/1982 | France . |
| WO91/13830 | 9/1991 | WIPO . |

*Primary Examiner*—Paul Marcantoni
*Attorney, Agent, or Firm*—Cushman Darby & Cushman

[57] ABSTRACT

The invention relates to new curable inorganic resins based on alkali metal boroaluminosilicates, which, before curing, include inorganic elements in the reactive state, in the following proportions, expressed as their molar ratio of oxides:

$2 \leq SiO_2/Al_2O_3 \leq 4$ $1.3 \leq X_2O/Al_2O_3 \leq 3.8$ $10 \leq H_2O/Al_2O_3 \leq 28$ $0.5 < B_2O_3/Al_2O_3 \leq 2.0$ $X_2O$ denoting one or more alkali metal oxides chosen from $Na_2O$, $K_2O$, $Li_2O$, and optionally fillers.

The invention also relates to the process for the preparation of these new inorganic resins.

The cured resins obtained are very useful for manufacturing heat protection materials.

9 Claims, No Drawings

INORGANIC RESINS, PROCESS FOR THEIR PREPARATION AND MATERIALS FOR HEAT PROTECTION

The invention relates to new inorganic resins based on alkali metal boroaluminosilicates and to a process for their preparation. It relates in particular to resins which cure at low temperature and form inorganic matrices which exhibit a strongly endothermic nature when exposed to heat. They are consequently very useful for manufacturing heat protection materials and in particular fire barrier materials.

Inorganic resins based on alkali metal aluminosilicates have been described, especially in French Patent Applications FR 2,489,291 and 2,659,319, but the materials manufactured by means of these resins, which are devoid of boron, have mechanical properties that are poor as soon as the temperature exceeds 200° C. When they are employed as barriers against fire, the high heat gradients which are produced within them give rise to fissuring or distortions from 200° C. It has also been found that these materials change in the course of time even at ambient temperature. Cracks appear, as well as surface efflorescences, showing that the resins are not chemically stable. Furthermore, some compounds employed for preparing the resins, such as thermal silica, have very variable properties depending on the source of supply and it is then difficult to obtain resins exhibiting the same characteristics by means of the same formulations. Another disadvantage of the resins of the prior art is that their curing cannot be performed immediately. They must, in fact, be left at rest for some time, frequently a few hours before this operation, and this lengthens the time for obtaining materials.

There was therefore a need for new inorganic resins that do not have the disadvantages of the resins of the prior art.

The subject of the invention is new inorganic resins based on alkali metal boroaluminosilicates obtained simply and rapidly from readily available compounds with uniform characteristics and which make it possible to obtain materials that are stable in time, retaining their mechanical properties at temperatures above 200° C. and usable as heat protection materials.

The new inorganic resins according to the invention include, before curing, inorganic elements in the reactive state, it being possible for boron to be also in a supersaturated state, in the following proportions expressed as their molar ratio of oxides:

$2 \leq SiO_2/Al_2O_3 \leq 4$ $1.3 \leq X_2O/Al_2O_3 \leq 3.8$ $10 \leq H_2O/Al_2O_3 \leq 28$ $0.5 < B_2O_3/Al_2O_3 \leq 2.0$ $X_2O$ denoting one or more alkali metal oxides chosen from $Na_2O$, $K_2O$ and $Li_2O$.

Advantageously, $X_2O$ denotes $Na_2O$, $K_2O$ or a mixture of $Na_2O$ and of $K_2O$, of $Li_2O$ and of $Na_2O$, of $Li_2O$ and of $K_2O$ or of $Li_2O$, of $Na_2O$ and of $K_2O$.

The preferred resins according to the invention are those in which the molar ratios of the oxides have the following values:

$3.0 \leq SiO_2/Al_2O_3 \leq 3.8$ $1.5 \leq X_2O/Al_2O_3 \leq 3.6$ $13.0 \leq H_2O/Al_2O_3 \leq 19.5$ $0.5 < B_2O_3/Al_2O_3 \leq 1.8$ $X_2O$ denoting potassium oxide, or the following values:

$2.0 \leq SiO_2/Al_2O_3 \leq 3.9$ $1.4 \leq X_2O/Al_2O_3 \leq 3.0$ $10 \leq H_2O/Al_2O_3 \leq 28.0$ $0.5 < B_2O_3/Al_2O_3 \leq 1.3$ $X_2O$ denoting sodium oxide or a mixture of sodium and potassium oxide.

They cure by an internal reaction of the hydrolysis-polycondensation type.

The alkali metal, silicon and aluminum oxides as well as the dissolved boron oxide combine to form the skeleton of the resin.

Once cured, the resins form matrices which have good physical and mechanical properties and an excellent endothermic nature.

They can be employed as protection against heat attacks, as a self-supporting structure or coating.

One or more very diverse organic, inorganic and/or metallic fillers may be incorporated in the resins before curing. The fillers are generally in granular or fibrous form. They are advantageously inorganic substances.

The proportion of fillers is not more than 50% by volume relative to the total volume of the resin and of the fillers.

Alkaline-earth metal sulphates, oxides and hydroxides, in particular those of calcium and magnesium, alumina, alumina hydrates, zinc oxide, borax and aluminosilicates may be mentioned as an example of fillers.

Other conventional constituents of the resins may also be added, such as pigments or adjuvants.

Another subject of the present invention relates to the process for the preparation of these new resins.

This process consists in performing a homogeneous mixing of the following two precursors which are prepared separately:

I) a precursor which is a powder consisting of an aluminosilicate obtained by rendering amorphous a 1:1 clay in which the Si/Al atomic ratio is equal to 1;

II) a liquid precursor which is an alkaline aqueous solution containing, in the dissolved state, at least one alkali metal element chosen from sodium, potassium and lithium, boron and optionally silicon, it being possible for the boron to be present in a quantity greater than its saturation;

the quantities of the various constituents being determined so that their molar ratios in the mixture, expressed as oxide, have the following values:

$2 \leq SiO_2/Al_2O_3 \leq 4$ $1.3 \leq X_2O/Al_2O_3 \leq 3.8$ $10 \leq H_2O/Al_2O_3 \leq 28$ $0.5 < B_2O_3/Al_2O_3 \leq 2.0$ $X_2O$ denoting one or more alkali metal oxides chosen from $Na_2O$, $K_2O$ and $Li_2O$.

A sufficiently fluid resin is thus obtained, which can be cured immediately.

Advantageously, $X_2O$ denotes $Na_2O$, $K_2O$ or a mixture of $Na_2O$ and of $K_2O$, of $Li_2O$ and of $Na_2O$, of $Li_2O$ and of $K_2O$ or of $Li_2O$, of $Na_2O$ and of $K_2O$.

According to a preferred process the molar ratios of the oxides in the mixture have the following values:

$3.0 \leq SiO_2/Al_2O_3 \leq 3.8$ $1.5 \leq X_2O/Al_2O_3 \leq 3.6$ $13.0 \leq H_2O/Al_2O_3 \leq 19.5$ $0.5 < B_2O_3/Al_2O_3 \leq 1.8$ $X_2O$ denoting potassium oxide, or the following values:

$2.0 \leq SiO_2/Al_2O_3 \leq 3.9$ $1.4 \leq X_2O/Al_2O_3 \leq 3.0$ $10 \leq H_2O/Al_2O_3 \leq 28.0$ $0.5 < B_2O_3/Al_2O_3 \leq 1.3$ $X_2O$ denoting sodium oxide or a mixture of sodium and potassium oxide.

The 1:1 clays which form the raw material of the powdered precursor are available commercially. It is preferable that they should be finely ground and, to obtain better reactivity, the ones employed are preferably those in which the particles have a dimension smaller than 5 μm. In general, the clay employed is kaolin and preferably one in which the kaolinite content is higher than 70%.

The clays must be rendered amorphous in order to make them reactive with the liquid precursor. Rendering them amorphous can be achieved according to known processes. A process which is suitable within the scope of the present invention is the heat treatment of the clays, preferably at a temperature of between 600° C. and 1100° C. The duration of treatment is a function of the temperature. At 700° C. this duration is of the order of a few hours. At 1000° C. a few seconds may suffice to obtain this amorphousness. Another way of rendering the clays amorphous consists in dispersing them in strong and concentrated acids such as hydrochloric acid, sulphuric acid or nitric acid. A number of different treatments for rendering amorphous can be performed in succession. When the two preceding treatments are performed it is generally preferred to carry out the treatment with acid before the heat treatment. The amorphousness of the clays can be ascertained by examining their X-ray diffraction spectra, in which there should be no visible sign of the kaolinite crystallization spectrum or of the spectra of the crystalline phases which are generated at a temperature above 1100° C.

The liquid precursor is an aqueous solution which must contain, in the dissolved state, at least one alkali metal element chosen from sodium, potassium and lithium, and boron, it being possible for the latter to be in a supersaturated state, and optionally silicon.

In order to obtain a stable liquid precursor it is necessary, on the one hand, that all the constituents should be well dissolved to form a solution. This dissolved state is also necessary in order that these constituents may form the skeleton of the resin with the other constituents of the powdered precursor. On the other hand, the liquid precursor must not be too viscous in order to be capable of being mixed with the powdered precursor and in order to obtain a sufficiently fluid resin which can be moulded or shaped and which can optionally contain fillers or which can be used for impregnation. The viscosity of the liquid precursor is preferably lower than or equal to 30 poises.

The alkali metal elements are generally introduced into the aqueous medium, by means of alkali metal hydroxides, NaOH, KOH and/or LiOH.

The boron is introduced by means of one of its forms and/or at least one of its compounds capable of dissolving in an aqueous and alkaline medium, such as, for example, an oxide, salt, acid or hydroxide. Orthoboric acid is advantageously employed. When it is desired to obtain a resin with a high proportion of boron, the liquid precursor must contain a very large quantity of this element and it is possible that the solution may contain a boron-based precipitate in the case of a $B_2O_3/Al_2O_3$ ratio $\geq 1.1$.

When it is intended to introduce silicon into the liquid precursor, this is added in the form of an alkali metal—sodium and/or potassium—silicate in the aqueous medium.

To obtain the liquid precursor it is generally preferred to introduce into the water first the alkali metal hydroxide(s) and then optionally the silicate(s) and finally the boron compound(s). The mixture may be heated in order to promote good homogeneity.

The mixing of the liquid precursor and of the powdered precursor is performed at ambient temperature, for example by means of a propeller mixer. A pourable or shapable homogeneous resin is rapidly obtained, which can be used for manufacturing objects by the usual techniques, especially by moulding. This resin may then be cured without any time at rest being necessary. The curing is a result of the reaction which takes place and which may be related to a hydrolysis-polycondensation reaction. The resin may be cured as it is or else after it has been mixed with inorganic, metallic and/or organic fillers such as described above, or after having impregnated fibers or materials containing fibers, such as mats and fabrics.

The curing may be performed at a temperature of between 0° and 150° C. It is slow up to ambient temperature, close to 20° C. It is preferred to heat the resin to a temperature of between 40° and 120° C. The curing time varies as a function of the resin formulation, of the temperature and of the heating method employed. Some formulations cure in less than one hour at 80° C. by means of conventional heating using external heat input. A few seconds may suffice by means of microwave heating.

The curing must be carried out in the presence of all the water present in the resin. It is consequently necessary to operate in a hermetic or water-saturated medium.

When the curing reaction is at a very advanced stage it may be allowed to finish under ambient temperature and moisture content conditions, preferably after the material has first been cooled to a temperature close to the ambient temperature. Drying may optionally be performed next, for example in an oven.

Practically no shrinkage is produced when moulded objects are manufactured with the resins according to the invention. The objects have a good surface hardness. They exhibit neither cracking nor distortion and have good mechanical properties.

Because of their high endothermicity, the resins according to the present invention are particularly useful as heat protection materials and in particular as a barrier against fire. They can be moulded into different shapes and, for example, into the form of panels. Tests performed with panels with a thickness of between 10 and 30 mm show that these materials can be used fully against heat attacks such as, in particular, a progressive rise in temperature up to approximately 1200°, or a heat flash for ten minutes or so at 850° C.

The heat-insulating nature of the moulded objects based on resins according to the invention can be improved further by bonding onto one or more faces of the object a heat-reflecting element which may consist, for example, of a very fine layer of mica or of flakes of an amorphous metal known as "metallic glass", placed on the face(s) of the object and held by a glass mat impregnated with an unfilled inorganic resin such as described above, which will perform the bonding on curing. The reflective element is placed on one or more faces inside the mould which is to receive the resin and will be bonded to the face(s) of the object after the whole has been cured.

The examples which follow illustrate the invention without, however, limiting it.

Examples 1 to 8

Different resins according to the invention are prepared from the compounds and in the manner which are shown below:

Powdered precursor

Kaolin from various sources which has been rendered amorphous by heat treatment is employed:
$A_1$: "B 24" kaolin marketed by the company Blancs Min éraux de Paris, heat-treated at 800° C. for 4 hours.
$A_2$: "Grade B" kaolin marketed by the company English China Clay, heat-treated at 800° C. for 4 hours.
$A_3$: "Supreme" kaolin marketed by the company English China Clay, heat-treated at 800° C. for 4 hours.
$A_4$: "Polestar 501" kaolin marketed by the company English China Clay.

Liquid precursor

This is obtained by introducing different quantities of the following compounds progressively into distilled water:
sodium hydroxide pellets ($m_N$)
potassium hydroxide pellets ($m_K$)
potassium silicate of formula $K_2O.3SiO_2.3H_2O$ ($n_K$)
sodium silicate of formula $Na_2O.3SiO_2.3H_2O$ ($n_N$)
powdered orthoboric acid, $H_3BO_3$ (aob)

The terms in brackets are employed in the tables which follow to denote the quantities of the compounds in grams. The letter h will be employed to denote the quantity of water, in grams.

The hydroxide(s) is (are) generally introduced first, followed by the silicate(s) and then the orthoboric acid.

The mixture is stirred and optionally heated in order to obtain good homogeneity.

To obtain the resin, mixing of the two precursors is performed at ambient temperature by gradually incorporating the powder into the liquid solution in proportions shown by the following relationship:

L/A=mass of the liquid precursor/mass of the powder precursor

Stirring is carried out for approximately 15 minutes, and then, when it is intended to obtain a filled resin, 10% by volume of one or more of the following fillers is incorporated, relative to the total volume of the resin and of the fillers. When there are a number of fillers, these are added in equal proportions. The abbreviations employed are shown in brackets.
Alumina: "Spher 200–500" sold by the company Durmax (Sp25)
Borax (Bx)
Aluminosilicates:
  Poraver 1-2 (P12)
  Poraver 2-4 (P24)
  Poraver 0.25-0.5 (P02505)
which are sold by the company Poraver Alumina trihydrate (ATH)
Powdered zinc oxide (Z)
Magnesium oxide, relative density 0.2 (M)
Calcium hydroxide (C)
Calcium sulphate (CS)
Magnesium sulphate (MS).

The resin and the fillers are mixed vigorously for approximately 10 minutes.

The resin alone or containing the fillers is then poured into a polyethylene box which is closed hermetically. The whole is not allowed to stand; curing is performed immediately by placing the box in an oven at 60° C. At this temperature setting of the resin, whether filled or not, generally takes place in less than 15 hours. Some compositions cure in less than 5 hours.

The piece obtained is demoulded one hour after leaving the oven and the appearance of this piece is marked according to the following criteria:

a: monolithic piece, good resistance to manual pressure—hard surface not scratched by a fingernail—no shrinkage or distortion b: monolithic piece, resistance to manual pressure and a hard surface which are obtained after the curing has been allowed to finish at ambient temperature—no cracking or distortion.

The results of the tests are collated in Tables I and II below.

The molar ratios of oxides are denoted by the following abbreviations:
S: $SiO_2/Al_2O_3$
K: $K_2O/Al_2O_3$
N: $Na_2O/Al_2O_3$
NK: $Na_2O+K_2O/Al_2O_3$
H: $H_2O/Al_2O_3$
B: $B_2O_3/Al_2O_3$ In the line "setting composition", when the resin is cured alone, it is marked R. When it contains fillers, the latter are shown as their abbreviations. When a number of filler types are employed, they are shown in brackets.

Examples 9 and 10

The following test is performed to show the heat protection property of the resins according to the invention:

Sheets 300×300 mm² in size and 30 mm in thickness are manufactured and are subjected to a heat attack according to ISO Standard 834 on one face and the time needed for the other, back, face to reach temperatures of 100° and 170° C. is determined.

The sheets are obtained by introducing into a mould the following resin compositions, prepared as shown in the preceding examples.

A 300 g/m² conventional glass mat impregnated with one of the organic resins of the invention, exhibiting a fast cure, is placed beforehand on the upper and lower faces of the mould and on this mat is placed a layer of approximately 0.2 millimetre thickness, consisting of metallic glass flakes 30 mm in length, which is Fibraflex sold by the company SEVA. The mould is placed between the platens of a press, the temperature of which is 100° C. A pressure of 2 to 3 bars (0.2 to 0.3 MPa) is applied in order to make the material flow and fill the mould which is completely closed.

The results are shown in Table III below.

Examples 11 and 12

The following test is performed to show the heat protection property of the resins according to the invention during an abrupt heat attack at 850° C. for 10 minutes:

The door of an electric oven heated to 850° C. is replaced with a sheet with a thickness of between 10.5 and 11 mm and this sheet is left in place for 10 minutes. The sheet is then removed from the oven and the maximum temperature reached by the unexposed face is noted.

The sheets are produced as before by introducing into a mould resin compositions prepared as shown in Examples 1 to 8. Only the face placed on the heat attack side and the sides optionally comprise a reflector consisting of a 50 g/m² glass mat impregnated with a fast-curing inorganic resin according to the invention and of a layer of approximately 0.2 mm thickness of Fibraflex flakes 15 mm in length.

The results are shown below:

| Examples | 11 | 12 |
|---|---|---|
| Powder precursor | A4 | A3 |
| Liquid precursor | L2 | L7 |
| L/A | 2.93 | 2.93 |
| Fillers (mass % relative to the total mass: resin plus fillers) | CS (12) and P12 (12.7) | M (5) and P02505 (17) |
| Reflector | yes | no |
| Maximum temperature of the unexposed face | 235° C. | 216° C. |

Examples 13 and 14

Resins containing potassium and lithium as alkali metal elements are prepared by the operating method described in Examples 1 to 8.

Lithium is introduced in the form of powdered lithia (LiOH).

The preparation of the liquid precursor is carried out by completely dissolving the ingredients in the following order:

1 dissolving lithia in water, 2 adding potassium hydroxide, 3 adding potassium silicate, powdered or in liquid form, 4 adding orthoboric acid.

In each operation it is necessary to wait for the different compounds formed to dissolve. These operations take place cold, since heating results in the formation of insoluble species.

The characteristics of the resins are as follows:

| EXAMPLES | 13 | 14 |
|---|---|---|
| Powder reference | A4 | A4 |
| Liquid precursor | | |
| h | 108.3 | 108.3 |
| $n_K$ | 35 | 35 |
| $m_K$ | 46.7 | 46.7 |
| $m_L$ | 5.6 | 7.2 |
| aob | 35 | 35 |
| L/A | 2.5 | 2.5 |
| S; KT; H | 3.0; 1.6; 20.2 | 3.0; 1.7; 20.2 |
| B | 0.7 | 0.7 |
| Setting composition | R | R |
| Appearance of the monoliths after demoulding | a | a |
| Setting time at 60° C. | 24 hours | 24 hours |

$m_L$ denotes the quantity of lithia present in the liquid precursor, in grams

KT denotes the molar ratio $Li_2O+K_2O/Al_2O_3$

TABLE I

| EXAMPLE | 1 | 2 | 3 | 4 |
|---|---|---|---|---|
| POWDER REFERENCE | A1 | A3 | A4 | A1 |
| LIQUID REFERENCE | L1 | L2* | L3* | L4* |
| h | 100 | 100 | 100 | 100 |
| $n_K$ | 65.6 | 65.6 | 0 | 65.6 |
| $m_K$ | 54.6 | 197.8 | 197.5 | 217.8 |
| aob | 30 | 90 | 90 | 130 |
| L/A | 2 | 2.93 | 2.93 | 3.22 |
| S; K; H | 3.8; 1.5; 15.9 | 3.1; 3.0; 15.8 | 2.2; 3.2; 17.3 | 3.5; 3.6; 19.1 |
| B | 0.51 | 1.1 | 1.3 | 1.8 |
| SETTING COMPOSITION | R | R, ATH, M, Bx, (Bx-M), (Bx-ATH) | R, M, C, CS, (MS-C) | R, P24 |
| APPEARANCE OF THE MONOLITHS AFTER DEMOULDING | a | a, a, a, a, a | b, b, b, b, b | a, a |
| SETTING TIME SHORTER THAN 5 HOURS AT 60° C. | yes | yes | no | yes |

The sign * shows that a white precipitate formed in the liquid solution

TABLE II

| EXAMPLE | 5 | 6 | 7 | 8 |
|---|---|---|---|---|
| POWDER REFERENCE | A1 | A1 | A3 | A4 |

TABLE II-continued

| EXAMPLE | 5 | 6 | 7 | 8 |
|---|---|---|---|---|
| LIQUID REFERENCE | L5 | L6 | L7* | L8* |
| h | 100 | 100 | 100 | 100 |
| $n_N$ | 22 | 30 | 0 | 0 |
| $m_{K;\ mN}$ | 0; 30 | 0; 36 | 0; 53 | 67; 47 |
| aob | 23 | 32 | 36 | 60 |
| L/A | 2.53 | 2.53 | 2.94 | 2.93 |
| S; NK; H | 3.4; 1.8; 26.2 | 3.6; 1.9; 24.5 | 2.2; 2.5; 26.6 | 2.2; 3.0; 21.2 |
| B | 0.7 | 0.9 | 1.1 | 1.3 |
| SETTING COMPOSITION | R, ATH, P12, P24 | R, Z, ATH | R, M, Bx, (M-P12) | R, C, M, CS, (MS-C) |
| APPEARANCE OF THE MONOLITHS AFTER DEMOULDING | a, a, a, a | a, a, a | b, b, b, a | b, b, b, b, b |
| SETTING TIME SHORTER THAN 5 HOURS AT 60° C. | no | yes | no | no |

The sign * shows that a white precipitate formed in the liquid solution

TABLE III

| EXAMPLE | 9 | 10 |
|---|---|---|
| LIQUID PRECURSOR | L2 | L7 |
| POWDER PRECURSOR | A2 | A2 |
| L/A | 2.93 | 2.94 |
| FILLERS (MASS % RELATIVE TO THE MASS OF THE RESINS PLUS THE FILLERS) | P24 (50%) | Bx (8%) P24 (42%) |
| DENSITY BEFORE TEST | 0.76 | 0.68 |
| MASS PER UNIT AREA BEFORE TEST | 23 kg/m² | 20.5 kg/m² |
| FIRE BARRIER DEGREE ACCORDING TO ISO 834 (hours, minutes) | 1H03 | 1H00 |
| TIME TO REACH 100° | 53 min | 53 min |

We claim:

1. Curable inorganic resins based on alkali metal boroaluminosilicates and comprising, before curing, inorganic elements in the reactive state in the following proportions expressed as their molar ratio of oxides:

$$2 \leq SiO_2/Al_2O_3 \leq 4$$

$$1.3 \leq X_2O/Al_2O_3 \leq 3.8$$

$$10 \leq H_2O/Al_2O_3 \leq 28$$

$$0.5 < B_2O_3/Al_2O_3 \leq 2.0$$

$X_2$ denoting one or more alkali metal oxides chosen from $Na_2O$, $K_2O$ and $Li_2O$, with boron optionally present in a supersaturated state.

2. Inorganic resins according to claim 1 wherein $X_2O$ denotes $Na_2O$, $K_2O$, a mixture of $Na_2O$ and $K_2O$, a mixture of $Li_2O$ and $Na_2O$, a mixture of $Li_2O$ and $K_2O$ or a mixture of $Li_2O$, $Na_2O$ and $K_2O$.

3. Inorganic resins according to claim 1, wherein the molar ratios of the oxides have the following values:

$$3.0 \leq SiO_2/Al_2O_3 \leq 3.8$$

$$1.5 \leq X_2O/Al_2O_3 \leq 3.6$$

$$13.0 \leq H_2O/Al_2O_3 \leq 19.5$$

$$0.5 < B_2O_3/Al_2O_3 \leq 1.8$$

$X_2O$ denoting $K_2O$ or $$2.0 \leq SiO_2/Al_2O_3 \leq 3.9$$

$$1.4 \leq X_2O/Al_2O_3 \leq 3.0$$

$$10 \leq H_2O/Al_2O_3 \leq 28.0$$

$$0.5 < B_2O_3/Al_2O_3 \leq 1.3$$

$X_2O$ denoting $Na_2O$ or a mixture of $Na_2O$ and $K_2O$.

4. Inorganic resins according to claim 1 which also comprise one or more fillers selected from the group consisting of inorganic, metallic and organic fillers.

5. Inorganic resins according to claim 4 wherein the filler comprises at least one inorganic filler.

6. Inorganic resins according to claim 5 wherein the inorganic fillers are selected from the group consisting of alkaline-earth metal sulphates, alkaline-earth metal oxides, alkaline-earth metal hydroxides, alumina, alumina hydrates, zinc oxide, borax and aluminosilicates.

7. Inorganic resins according to claim 1 or 4, wherein said resins are in cured form.

8. An article of manufacture comprising the resin according to claim 1.

9. A heat protection material comprising the resin of claim 1 which has been molded and cured.

* * * * *